Figure 1:
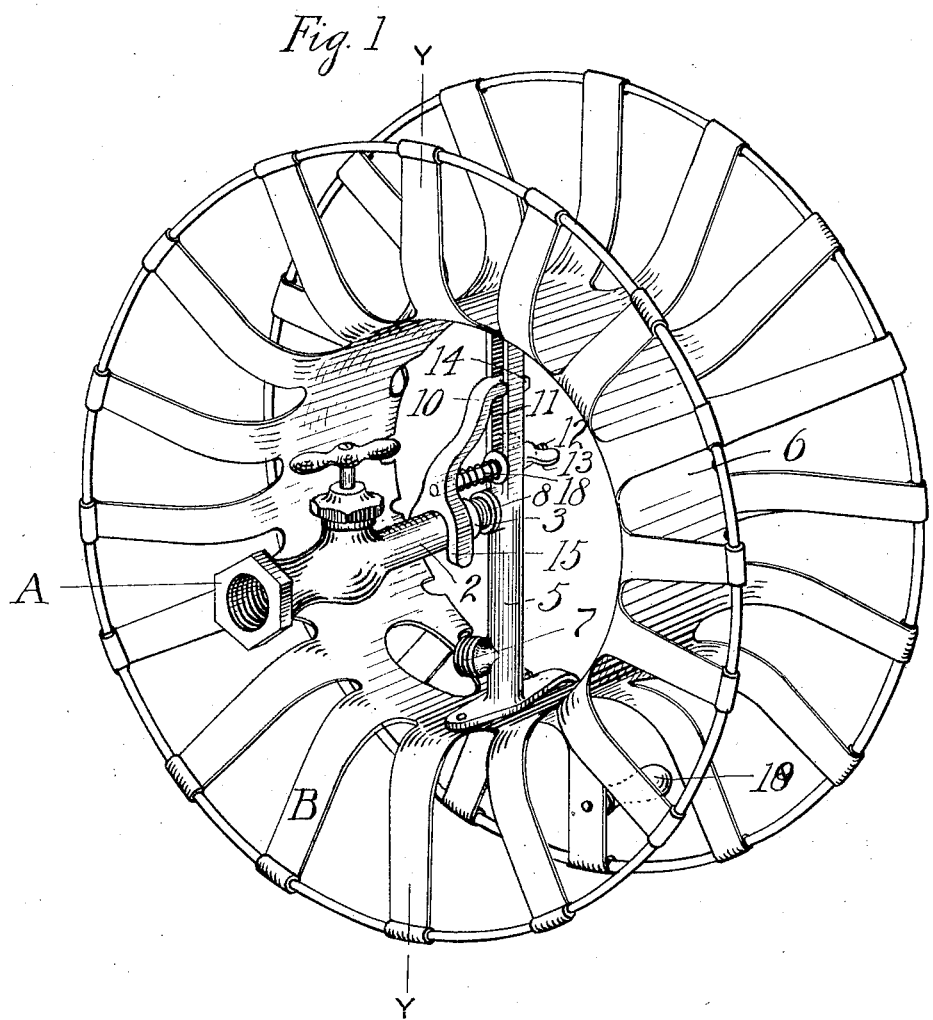

W. BOSS.
HOSE RACK.
APPLICATION FILED FEB. 20, 1909.

1,058,538.

Patented Apr. 8, 1913.

2 SHEETS—SHEET 1.

Witnesses,
George Voelker
H. Smith

Inventor,
William Boss
by Lothrop & Johnson
his Attorneys.

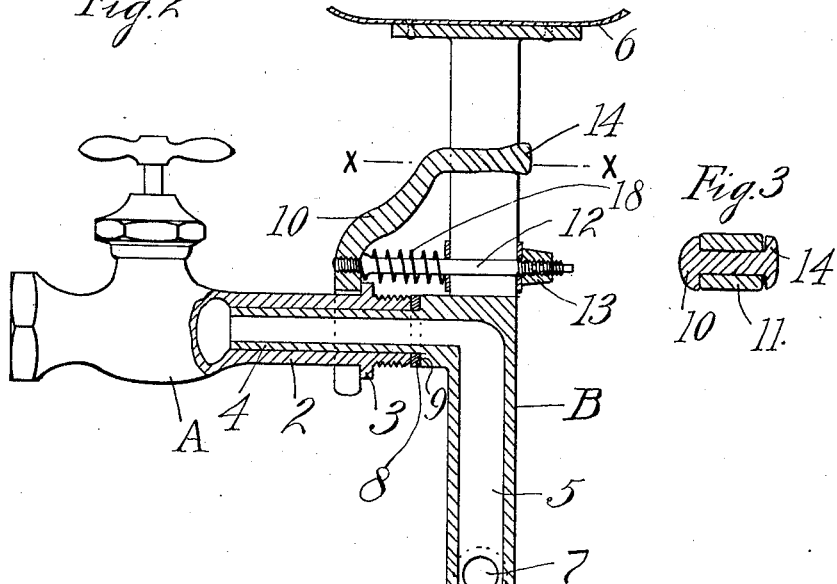
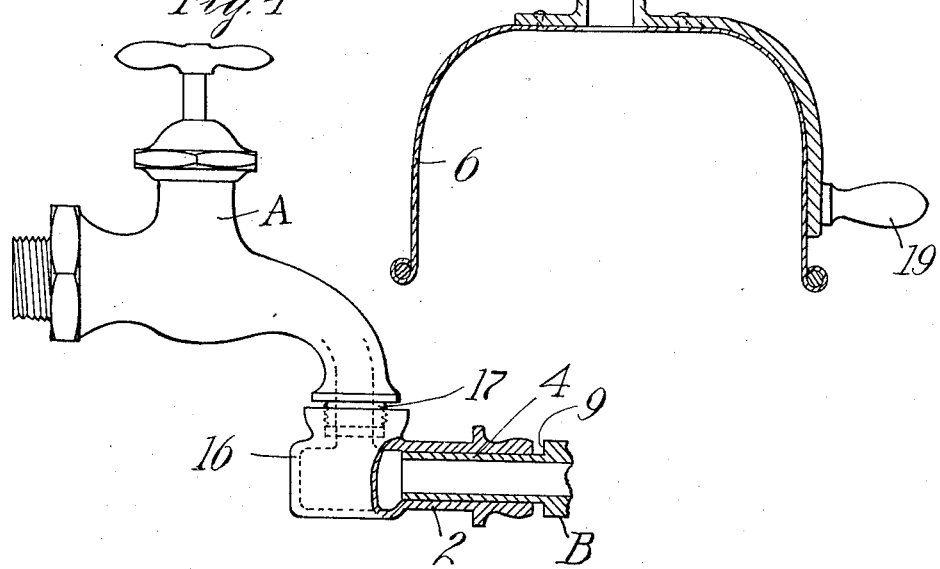

UNITED STATES PATENT OFFICE.

WILLIAM BOSS, OF ST. PAUL, MINNESOTA.

HOSE-RACK.

1,058,538.  Specification of Letters Patent.  Patented Apr. 8, 1913.

Application filed February 20, 1909. Serial No. 479,134.

*To all whom it may concern:*

Be it known that I, WILLIAM Boss, a citizen of the United States, residing at St. Paul, in the county of Ramsey and State of Minnesota, have invented certain new and useful Improvements in Hose-Racks, of which the following is a specification.

My invention relates to improvements in hose reels, its object being particularly to provide a hose reel which can be detachably supported from a water faucet and which will be rotatable thereon to assist in winding and unwinding the hose.

To this end my invention consists in the features of construction and combination hereinafter particularly described and claimed.

In the accompanying drawings, forming part of this specification, Figure 1 is a perspective view of the preferred form of my invention, Fig. 2 is a section on line $y$—$y$ of Fig. 1, Fig. 3 is a section on line $x$—$x$ of Fig. 2, and Fig. 4 is a side elevation of an ordinary form of faucet showing the method of attaching my invention thereto.

In the drawings A represents a faucet having a straight discharge pipe 2 formed at its outer end with a surrounding circumferential rib 3. Adapted to be removably supported above the faucet is my improved reel B. The reel comprises a central hub 4 formed with a radial hollow spoke 5 which supports upon its outer end the hose receiving reel frame 6. The hollow spoke 5 connects with a coupling 7 extending through the bottom of the reel frame to receive the end of an ordinary garden hose not shown.

As shown in Fig. 2 the hollow hub 4 of the wheel rotatably fits within the discharge pipe 2 of the faucet, suitable packing 8 being arranged between the end of the discharge pipe and the shoulder 9 of the hub to effect a water tight joint. The reel is held in position upon the discharge pipe by means of a dog 10 supported in the guide way 11 by means of a rod 12 threaded in the dog and slidably extending through the guide way, a suitable thumb nut 13 being threaded upon the outer end of the rod in position to bear against the adjacent side of the guide way. The outer end 14 of the dog slides in the guide way as indicated in Fig. 1 and the inner end of the dog is formed in the shape of a yoke 15 straddling the discharge pipe and bearing against the adjacent side of the rib 3.

In Fig. 4 I show my device supported from an ordinary downwardly extending faucet. In this form the discharge pipe 2 carries an elbow 16 interiorly threaded to receive the threaded end 17 of the faucet. The construction of the device is otherwise as shown in Figs. 1 and 2. A spring 18 surrounds the rod 12 between the dog and guide way to force the dog away from the rib when the thumb nut is loosened.

In operation the reel will be supported on the end of the faucet as shown and the garden hose attached to the coupling 7. The reel may then be rotated upon the discharge pipe to wind or unwind the hose, the reel being turned by the handle 19. The pressure of the dogs 10 against the rib 3 is sufficient through the medium of the packing 8, to maintain a water tight joint, while at the same time allowing the reel to be rotated.

I claim as my invention:—

1. In combination with a faucet, a hose supporting reel and means rotatably supporting the same upon the end of the faucet comprising faucet engaging means carried by and removable with the reel, said means being adjustable toward said reel.

2. In combination with a faucet, a reel rotatively supported upon the end of said faucet, and a dog carried by said reel and normally interlocking with said faucet, said dog being adjustable toward said reel.

3. In combination with a faucet, a reel rotatively supported on the end thereof, a dog slidably supported by said reel adjacent to said faucet, and means for holding said dog in securing engagement with said faucet.

4. In combination with a faucet, a reel, a hollow hub for said reel supported upon the end of the faucet, an external circumferential rib carried by said faucet, a dog carried by said reel and slidable toward and from said faucet, and means holding said dog in engagement with said rib.

In testimony whereof I affix my signature in presence of two witnesses.

WILLIAM BOSS.

Witnesses:
H. S. JOHNSON,
H. SMITH.

Copies of this patent may be obtained for five cents each, by addressing the "Commissioner of Patents, Washington, D. C."